US006443096B1

(12) United States Patent
Prydie

(10) Patent No.: US 6,443,096 B1
(45) Date of Patent: Sep. 3, 2002

(54) APPARATUS FOR TRANSPORTING FOOD AND WATER FOR PETS

(75) Inventor: David J. Prydie, Loughton (GB)

(73) Assignee: Instinctively Cats and Dogs, Essex (GB)

( * ) Notice: Subject to any disclaimer, the term of this patent is extended or adjusted under 35 U.S.C. 154(b) by 0 days.

(21) Appl. No.: 09/630,166

(22) Filed: Aug. 1, 2000

(51) Int. Cl.7 ................................................ A01K 5/00
(52) U.S. Cl. ............................ 119/61; 119/73; 206/223
(58) Field of Search ................... 119/61, 73; 206/223, 206/541, 547, 549; 383/901

(56) References Cited

U.S. PATENT DOCUMENTS

| | | | | |
|---|---|---|---|---|
| 4,216,862 A | * | 8/1980 | Daenen | 206/541 |
| 5,427,265 A | * | 6/1995 | Cautereels et al. | 220/318 |
| 5,704,485 A | * | 1/1998 | Cautereels et al. | 206/546 |
| 5,752,464 A | * | 5/1998 | King et al. | 119/63 |
| 5,787,839 A | * | 8/1998 | Magnant et al. | 119/51.5 |
| 5,823,136 A | * | 10/1998 | Zarski | 119/61 |
| 6,109,059 A | * | 8/2000 | Lebrun | 62/457.5 |
| 6,151,910 A | * | 11/2000 | Hazen | 62/457.2 |
| D447,917 S | * | 9/2001 | Miller et al. | D7/629 |

* cited by examiner

Primary Examiner—Charles T. Jordan
Assistant Examiner—Kimberly S. Smith
(74) Attorney, Agent, or Firm—Ladas & Parry

(57) ABSTRACT

An apparatus for transporting food and water for pets has a first bowl hingedly attached to a second bowl. Each bowl has a base and extending therefrom is a peripheral side wall terminating in a peripheral edge, each bowl having an open top. In a closed position the peripheral edges are arranged to be adjacent one another and when the bowls are open in a feeding/drinking position, food or drink may be inserted into a respective bowl. A lid is provided for one of the bowls having a snap-fit seal engaging with the peripheral edge of the bowl to which the lid is attached. The lid incorporates an integrally mounted freezer pack for maintaining the contents of the apparatus cool.

15 Claims, 3 Drawing Sheets

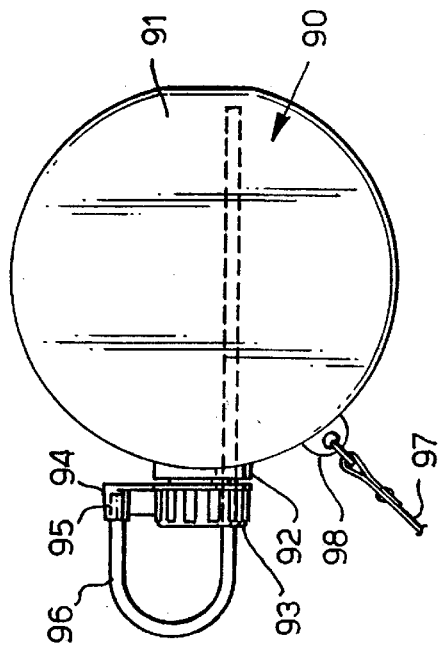
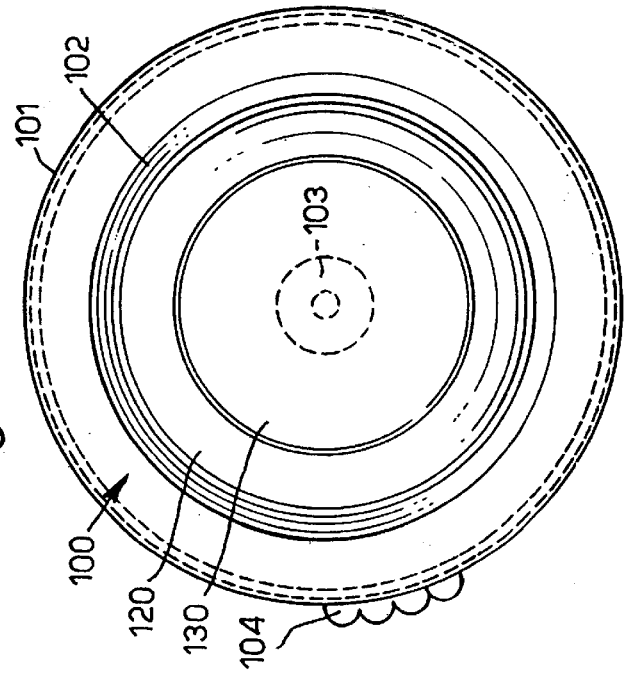
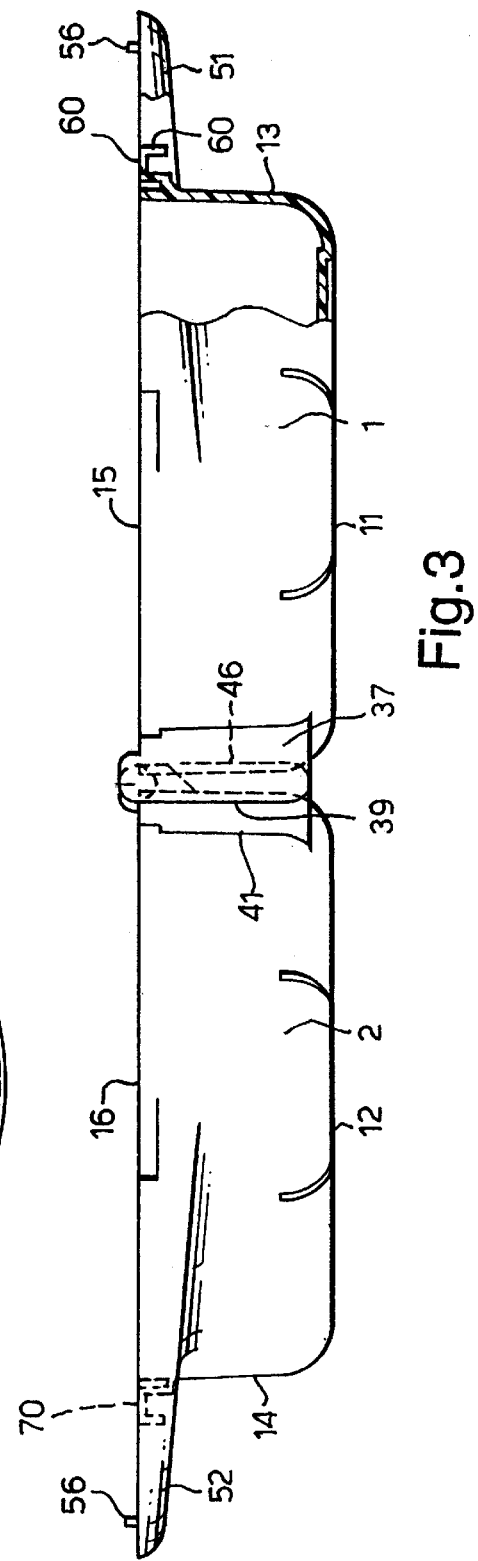

APPARATUS FOR TRANSPORTING FOOD AND WATER FOR PETS

BACKGROUND OF THE INVENTION

1. Field of the Invention

This invention relates to an apparatus for transporting food and water for pets.

2. Description of Related Art

It is known from U.S. Pat. No. 5,752,464 to provide an apparatus for transporting and dispensing food and water for pets, the apparatus having two container portions, each having an outer shell and an animal-accessible inner bowl to receive food or water. A lid sealingly engages each of the animal accessible inner bowls to form a watertight seal. The outer shell of each of the containers has a lower rim and the containers are hingedly connected together by a hinge attached to the lower rims of each of the container portions. When the container portions are in a hingedly closed position, a base portion of each of the bowls lie back to back and the lids closing the bowls are in an outermost position. When the apparatus is opened, the lower rims of the container portions are arranged to lie in substantially the same plane upon a ground surface and such that the lids are uppermost. When the lids are removed an animal has access to food and water in the bowls.

SUMMARY OF THE INVENTION

Although the apparatus of the prior art provides a convenient manner of transporting food and water for pets, there is no provision for keeping the water and food cool.

It is, accordingly, an object of this invention to provide an apparatus for transporting food and water for pets in which means are provided for keeping the contents thereof cool.

According to this invention there is provided an apparatus for transporting food and water for pets including, a first bowl hingedly attached to a second bowl, each said bowl having a base and extending therefrom a peripheral side wall terminating in a peripheral edge, whereby each said bowl has an open top for receiving food or water into a respective one of the bowls when said bowls are hinged to an open position, and said first and second bowl peripheral edges abutting one another when said bowls are hinged to a closed position, and lid means for one of said bowls, said lid means having a peripheral rim forming snap-fit sealing means for engaging with said peripheral edge of the bowl to which said lid means is attached, and said lid means including an integrally mounted freezer pack for maintaining the contents of the bowls cool.

Preferably, a separable water canteen is provided for location within one of said first and second bowls.

Advantageously, fastener means are provided for releasably securing said first and second bowls in a closed position.

Conveniently, handle means are integrally secured to at least one of said bowls.

Advantageously, a pair of feet members are integrally secured to each said bowl for supporting said apparatus when said bowls are in said closed position, whereby said peripheral edges are substantially orthogonal to a surface upon which said feet members rest.

Advantageously, the feet of one said bowl are nested inside the feet of the other said bowl.

Preferably, said lid means has a dished inner surface for locating said integrally mounted freezer pack.

Conveniently, said lid means has a centrally located boss member upstanding from said inner surface and said freezer pack is toroidially shaped having a centre portion thereof supportably mounted about said boss member.

Advantageously, a cap is secured to said boss member and said cap is arranged to extend at least partially over said freezer pack to assist holding the same in position in said lid means.

Preferably, grip means are attached to extend outwardly of said lid means for releasing said snap fit sealing means when the lid means is attached to the bowl.

Advantageously, alignment means are provided for aligning the first and second bowls into said closed position.

Conveniently, said alignment means comprises male and female members each located in a respective bowl.

Preferably, the first and second bowls and the lid means are moulded from plastics.

Advantageously, said bowls each have a circular cross-section.

Advantageously, the water canteen has a housing with a leak-proof screw cap having a radially extending arm, said arm being adapted to releasably retain one end of a flexible tube which extends through said cap into said housing.

BRIEF DESCRIPTION OF THE DRAWINGS

The invention will now be described, by way of example, with reference to the accompanying drawings, in which:

FIG. 3 shows a side view of the apparatus shown in FIGS. 1 and 2.

FIG. 4 is a top plan view of a lid which is used in the apparatus.

FIG. 5 is a top plan view of a water canteen which is used in the apparatus.

In the Figures like reference numerals denote like parts.

DESCRIPTION OF THE PREFERRED EMBODIMENTS

Figure 1:
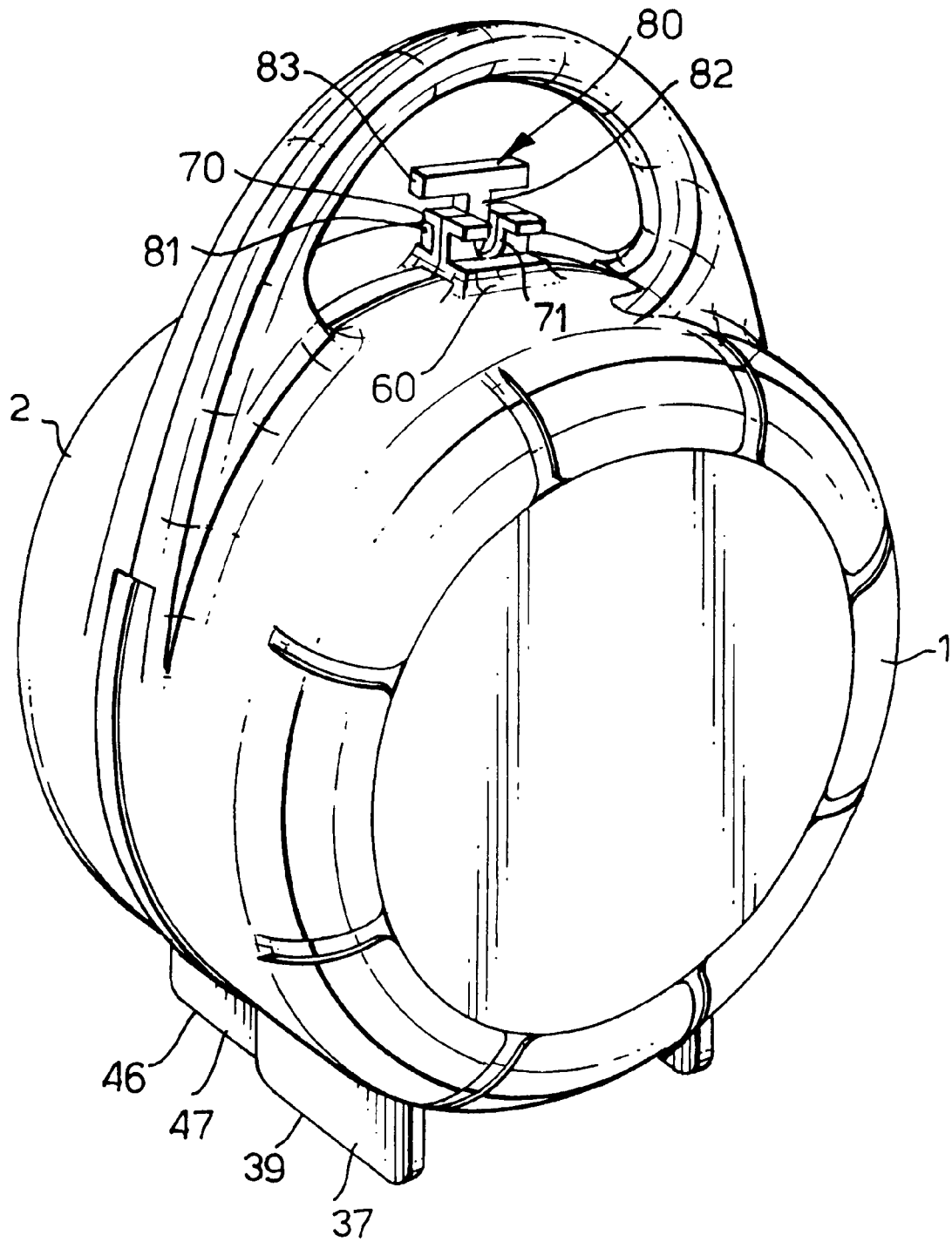
FIG. 1 shows a perspective view of an apparatus in accordance with this invention in a closed position.
Figure 2:
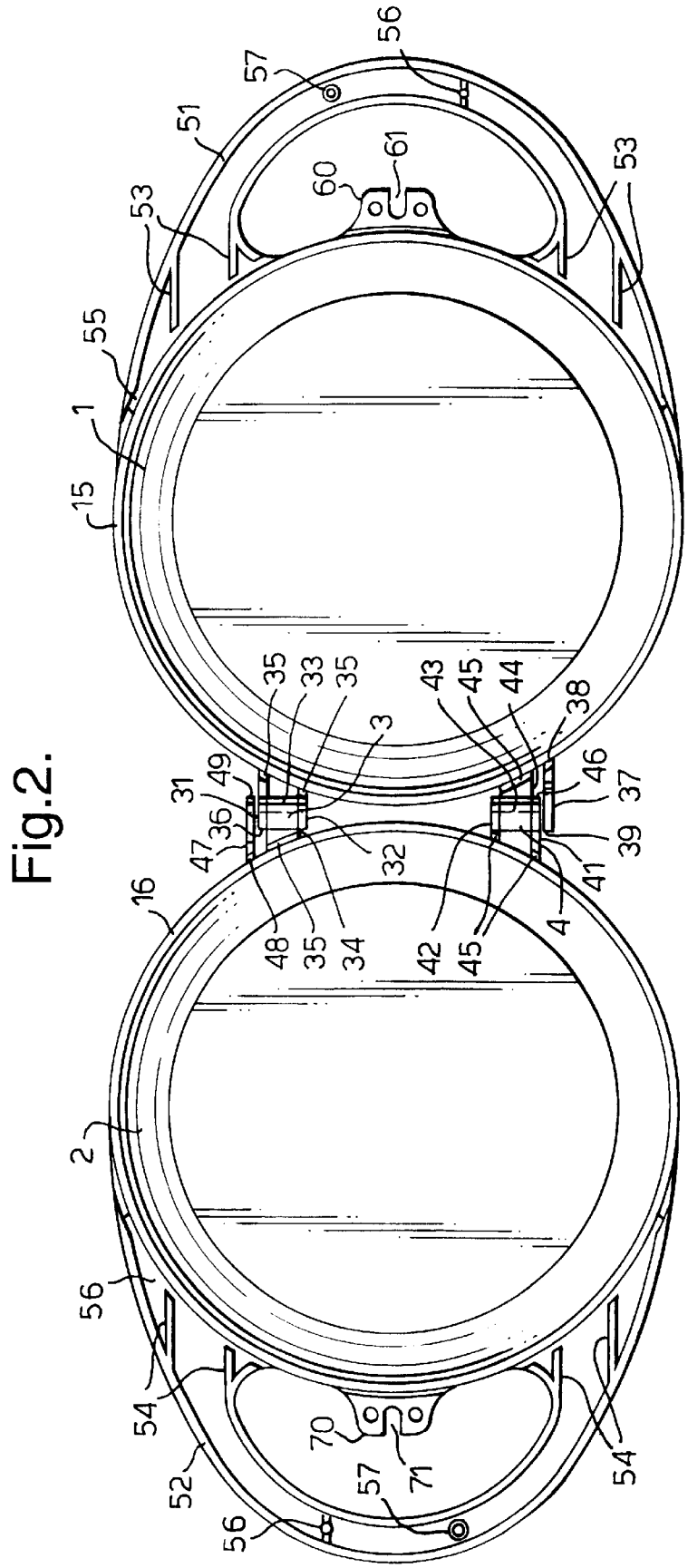
FIG. 2 shows a top plan view of the apparatus shown in FIG. 1 in an open position.

The apparatus shown in the drawings has a first bowl 1 and, a second bowl 2, the bowls 1, 2 being hingedly attached together at a peripheral portion thereof by hinges 3, 4. Each bowl has a base 11, 12 respectively and a peripheral side wall 13, 14 terminating in a respective peripheral edge 15, 16 remote from the base. The peripheral edge 15, 16 defines an open top of the respective bowls for animal access to food and water inserted into said bowls. The bowls preferably have a circular cross-section.

The hinge 3 is formed by a pair of webs 31, 32 attached to the peripheral side wall 13 of bowl 1, the webs having a circularly sectioned cross piece therebetween (not shown) over which is snap-fit an arcuate hook 33 attached to the peripheral side wall 14 of the bowl 2 by an arm 34. A recess 35 is formed in each of the webs 31, 32 and the arm 34 to accept a rim of a lid, as hereinafter described. In similar fashion to the hinge 3, the hinge 4 has webs 41, 42 attached to the peripheral side wall 14 of bowl 2 and a hook 43 at an extremity of arm 44 attached to peripheral wall 13 is snap-fitted over a cross piece (not shown) between the webs 41, 42. The webs 41, 42 and arm 44 also have a recess 45 for location of a rim of a lid 100 if the lid is located on the bowl 2.

The webs 31 and 41 are extended substantially the depth of the respective bowls to which they are attached to provide a surface 36, 46 for supporting the apparatus with the peripheral edges 15, 16 substantially orthogonal to the supporting surface. The webs 31, 41 thus each form a respective foot. A further foot 37, extending substantially the depth of bowl 1, is attached to the bowl 1 and has a recess 38 for a rim of the lid. The foot 37 has a supporting surface 39. Similarly, a further foot 47 is attached to the peripheral wall 14 and has a recess 48 for the rim of the lid and a supporting surface 49.

Each bowl is, preferably, made of plastics material and the hinges and webs are moulded therewith.

The bowls 1, 2 also each have preferably integrally moulded therewith a handle 51, 52 respectively. Each handle 51, 52 has a U-shaped cross-section with stiffening webs 53, 54 respectively. A recess 55, 56 is provided in each of the handles for accommodating the rim of the lid. The handles 51, 52 have upstanding male members 56 for locating inside female members 57 to assist in alignment between the bowls when in a closed position.

A fastener assembly has a member 60 moulded with bowl 1 and a member 70 moulded with bowl 2, each member 60, 70 having a U-shaped portion for accepting a resilient locking member 80. The locking member may have an I-shaped section such that one end 81 of the locking member is located in the U-shaped portion of member 60 and a transverse member 82 interconnecting the two horizontals 81 and 83 of the member 80 extends through a transverse slot 61, 71 of the member 60, 70. The resilient locking member 80 is thus able to releasably secure the two bowls in a closed position.

Located, in for example, bowl 1 is a water canteen 90 formed by a housing 91 having a watertight externally screw threaded neck 92 sealed by an internally screw threaded cap 93 to form a leak-proof seal for the canteen 90. The canteen may be provided with a carrying strap 97 attached to a lug 98. The cap 93 has a radially extending arm 94 in which is a cavity 95 for releasably retaining one end of a flexible tube 96 which extends through the cap and into the canteen housing 91.

The lid 100 has a peripheral rim 101 shaped to form a snap-fit seal which engages over the peripheral edge 16, although it is to be understood the lid could fit over the edge 15 if desired. The lid has a radially inner, upper surface 102 which is dished and a centrally located boss 103. Located in the dished portion 102 around the boss 103 is a torroidially shaped freezer pack 120. The freezer pack is retained in position by a cap 130 adhesively secured to the boss 103, the cap extending at least partially over the freezer pack. The lid 100 has a grip member 104 attached to the lid rim for extending radially outwardly so that the grip 104 may be used to prise open the seal when the lid 100 is sealingly snap-fitted over the peripheral edge.

In use of the apparatus, the lid is placed into a freezer to freeze the normally provided working fluid within the freezer pack and water is provided in the canteen which may be dispensed into bowl 1, say, and food may be located in bowl 2. The lid may be mounted over the opening of bowl 2, as shown in FIG. 3, to retain the food in the bowl 2. Alternatively, the lid may be located over the opening of bowl 1.

In an open position, shown in FIG. 3, the water and food contents may be inserted into the respective bowls 1, 2. In such a position, the bases 11, 12 are in a common plane as are the edges 15, 16. In a closed position, as shown in FIG. 1, the bases 11, 12 are in parallel planes, as are the edges 15, 16 which are adjacent one another.

It will, thus, be noted that with the present invention food and/or water may be kept cool.

I claim:

1. An apparatus for transporting food and water for pets including, a first bowl hingedly attached to a second bowl, each said bowl having a base and extending therefrom a peripheral side wall terminating in a peripheral edge, whereby each said bowl has an open top for receiving food or water into a respective one of he bowls when said bowls are hinged to an open position, and said first and second bowl peripheral edges abutting one another when said bowls are hinged to a closed position, and a lid means for one of said bowls, said lid means having a peripheral rim forming snap-fit sealing means for engaging with said peripheral edge of the bowl to which said lid means is attached, and said lid means including an integrally mounted freezer pack for maintaining the contents of the bowls at a cool temperature.

2. An apparatus as claimed in claim 1 wherein a separable water canteen is provided for location within one of said first and second bowls.

3. An apparatus as claimed in claim 1 wherein fastener means are provided for releasably securing said first and second bowls in a closed position.

4. An apparatus as claimed in claim 1 wherein handle means are integrally secured to at least one of said bowls.

5. An apparatus as claimed in claim 1 wherein a pair of feet members are integrally secured to each said bowl for supporting said apparatus when said bowls are in said closed position, whereby said peripheral edges are substantially orthogonal to a surface upon which said feet members rest.

6. An apparatus as claimed in claim 5 wherein the feet of one said bowl are nested inside the feet of the other said bowl.

7. An apparatus as claimed in claim 1 wherein said lid means has a dished inner surface for locating said integrally mounted freezer pack.

8. An apparatus as claimed in claim 7 wherein said lid means has a centrally located boss member upstanding from said inner surface and said freezer pack is toroidially shaped having a centre portion thereof supportably mounted about said boss member.

9. An apparatus as claimed in claim 8 wherein a cap is secured to said boss member and said cap is arranged to extend at least partially over said freezer pack to assist holding the same in position in said lid means.

10. An apparatus as claimed in claim 9 wherein grip means are attached to extend outwardly of said lid means for releasing said snap fit sealing means when the lid means is attached to the bowl.

11. An apparatus as claimed in claim 1 wherein alignment means are provided for aligning the first and second bowls into said closed position.

12. An apparatus as claimed in claim 11 wherein said alignment means comprises male and female members each located in a respective bowl.

13. An apparatus as claimed in claim 1 wherein the first and second bowls and the lid means are moulded from plastics.

14. An apparatus as claimed in claim 1 wherein said bowls each have a circular cross-section.

15. An apparatus as claimed in claim 2 wherein the water canteen has a housing with a leak-proof screw cap having a radially extending arm, said arm being adapted to releasably retain one end of a flexible tube which extends through said cap into said housing.

* * * * *